United States Statutory Invention Registration [19]

[11] Reg. Number: H129

Hansen [45] Published: Sep. 2, 1986

[54] MODULAR ARMOR SUPPORT

[75] Inventor: David N. Hansen, Joppa, Md.

[73] Assignee: The United States of America as represented by the Secretary of the Army, Washington, D.C.

[21] Appl. No.: 824,323

[22] Filed: Jan. 29, 1986

[51] Int. Cl.[4] ..... F41H 5/00

[52] U.S. Cl. ..... 89/36.04; 52/764

*Primary Examiner*—Harold J. Tudor

*Attorney, Agent, or Firm*—Anthony T. Lane; Harold H. Card, Jr.; Michael C. Sachs

[57] ABSTRACT

A modular armor support employs parallel bars affixed to a substrate for supporting modular armor panels a predetermined distance from the substrate. In one embodiment, the parallel bars are beams or rails affixed to the substrate and having abutment surfaces for supporting the modular armor panels with their edges in close abutment. The armor modules are affixed by bolts passing through holes in the armor modules and engaging threaded holes in bars extending between the beams or rails. In a further embodiment, the parallel bars are in the form of corrugated straps with lower portions bolted to bosses in the substrate and upper portions adjacent the modular armor panels. The lower and upper portions are connected by angled portions. Saddle clips embracing the upper portions have holes therein engageable by bolts passing through holes in the modular armor panels thus accommodating wide tolerances and permitting tightening the saddle clips upon the upper portions and thus affixing the modular armor panels to the corrugated strap.

6 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MODULAR ARMOR SUPPORT

GOVERNMENTAL INTEREST

The invention described herein may be manufactured, used and licensed by or for the Government for Governmental purposes without the payment to me of any royalties thereon.

BACKGROUND OF THE INVENTION

The present invention relates to defensive armor and, more particularly, to devices for supporting panels of defensive armor on a substrate.

Defensive armor is employed for protecting ground, sea and air vehicles, and buildings from projectile damage. One class of defensive armor includes that used on vehicles, such as tanks, whose structure is formed of a thick, high-strength material. Tanks are, thus, considered hard targets for projectile weapons requiring special weapons for their destruction. A further class of armor, with which the present invention is concerned, employs a curtain of armor panels or appliques suspended and spaced in front of a substrate. A space between the armor panels and the substrate permits the armor struck by a projectile to absorb a substantial part of the shock without transmitting it to the substrate.

For present purposes, the term substrate may be taken to include any type of surface requiring enhanced protection against projectile impact. A substrate may include, for example, a fixed structure such as a building, a vehicle such as a truck or armored personnel carrier, a sea vessel, or portions of an aircraft. For concreteness of description, however, the following disclosure is cast in the environment of a substrate consisting of a vehicle.

Vehicle armor panels are irregularly shaped to conform to the shape of a particular vehicle and are secured to the vehicle by bolts passing through holes bored in the armor panels into threaded bosses affixed to the substrate. Since they are irregularly shaped, damaged panels cannot easily be replaced in the field and, thus, a damaged vehicle must be removed from service. Armor panels are large and heavy and maneuvering them into position for installing the mounting bolts is difficult. Furthermore, it is difficult to maintain tolerances sufficient to align the holes in the armor panels with the holes in the threaded bosses during installation. This latter problem becomes particularly difficult when armor panels on a damaged substrate are replaced.

One solution to the problem of large and irregular armor panels is found in smaller modular armor panels which, due to their smaller size and weight, are easier to install and can generally conform to the shape of the vehicle. Since the modular armor panels are smaller, a larger number of armor panels is required, and the problem of a suitable mounting system is exacerbated.

In one possible technique, flanges are affixed to opposed edges of each armor panel. Bolts pass through holes in the flanges into threaded bosses affixed to the substrate. The holes in the flanges may be made oversize in an attempt to accommodate misalignment between them and the threaded bosses. This technique, besides only partly dealing with the misalignment problem, also reduces armor coverage due to the presence of the flanges.

OBJECTS AND SUMMARY OF THE INVENTION

Accordingly, it is an object of the invention to provide a modular armor support which overcomes the drawbacks of the prior art.

It is a further object of the invention to provide a modular armor support permitting substantially complete coverage of a substrate.

It is a still further object of the invention to provide a modular armor support having improved tolerance for alignment errors.

It is a still further object of the invention to provide a modular armor support which enables repair and replacement of damaged armor, even in the event of substantial damage to the substrate.

Briefly stated, the present invention provides a modular armor support employing parallel bars affixed to a substrate for supporting modular armor panels a predetermined distance from the substrate. In one embodiment, the parallel bars are beams or rails affixed to the substrate and have abutment surfaces for supporting the modular armor panels with their edges in close abutment. The armor modules are affixed by bolts passing through holes in the armor modules and engaging threaded holes in bars extending between the beams or rails. In a further embodiment, the parallel bars are in the form of corrugated straps with lower portions directly bolted to the substrate, or bolted to bosses in the substrate and upper portions adjacent the modular armor panels. The lower and upper portions are connected by angled portions. Saddle clips embracing the upper portions have holes therein engageable by bolts passing through holes in the modular armor panels, thus permitting tightening of the saddle clips upon the upper portions to affix the modular armor panels to the corrugated strap.

According to an embodiment of the invention, there is provided an armor support system for supporting armor panels on a substrate comprising, at least first and second generally parallel bars, means for affixing the at least first and second generally parallel bars spaced apart on the substrate, at least one armor panel, means for affixing the at least one armor panel on the at least first and second generally parallel bars, and the first and second generally parallel bars including means for spacing the at least one armor panel a predetermined distance from the substrate.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
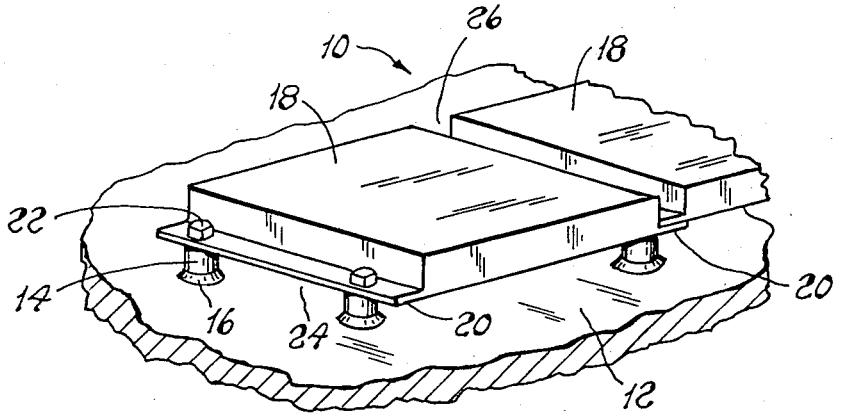
FIG. 1 is a perspective view of a modular armor system.

Referring now to FIG. 1, there is shown, generally at 10, a modular armor system. A substrate 12 which may be, for example, the surface of a vehicle, includes a plurality of spaced-apart threaded bosses 14. Threaded bosses 14 are affixed to substrate 12 by any convenient means such as, for example, weld beads 16. A plurality of modular armor panels 18 each includes a pair of flanges 20 at opposed ends thereof. Each flange 20 is affixed to a pair of threaded bosses 14 using, for example, bolts 22 passing through aligned holes (not shown) in flange 20 and threaded bosses 14. At locations where two modular armor panels 18 abut, flanges 20 are overlapped and affixed to threaded bosses 14 using the same two bolts 22 passing therethrough. Threaded bosses 14 have a height sufficient to provide a predetermined space 24 between modular armor panel 18 and substrate 12 for absorbing damage without full force transmission to substrate 12.

Problems of alignment occur between the threaded holes in threaded boss 14 and the related hole in flanges 20. This problem becomes especially severe when one or more modular armor panels 18 are replaced following damage. Such damage often includes damage to substrate 12 which, at best, distorts the positions of threaded bosses 14 making alignment difficult or impossible and, at worst, removes an area of substrate 12 containing one or more threaded bosses 14. It may therefore become difficult or impossible to repair the damage in the field and may thus require removing the vehicle from service for repair at a higher level repair facility.

In addition, due to the overlapping flanges 20, the embodiment of FIG. 1 includes an unarmored, or lightly armored, gap 26 between adjacent modular armor panels 18.

Figure 2:
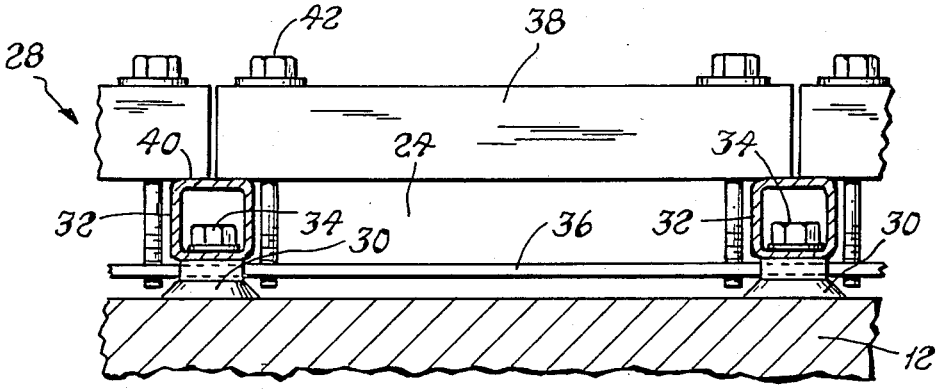
FIG. 2 is a partial cross section of a modular armor system according to an embodiment of the invention.

Referring now to FIG. 2, there is shown, generally at 28, a modular armor system according to an embodiment of the invention. A plurality of bosses 30 are affixed to substrate 12. A plurality of parallel rails 32 are affixed to substrate 12 using, for example, bolts 34 passing through aligned holes (not shown) in rails 32 and bosses 30. A bar 36 extends between adjacent rails 32 at locations where it is desired to attach modular armor panels 38. Each rail 32 includes an outer abutment surface 40 against which inner surfaces of adjacent modular armor panels 38 are drawn by threaded bolts 42 passing through holes (not shown) in modular armor panel 38 to engage threaded holes (not shown) in bar 36.

Since this embodiment of the invention interposes rails 32 between its bosses 30 and modular armor panels 38, bosses 30 are therefore shorter for a given space 24 and more rugged than is possible with the foregoing device. In addition, since modular armor panels 38 do not require flanges for attachment, their edges can be positioned in substantial abutment. Thus, substantially complete armor coverage of substrate 12 is achievable. In addition, in the event damage should destroy a portion of substrate 12, rails 32 may be extended over damaged portions without the support of bosses 30, whereby field repair is enhanced.

Although it provides a substantial improvement, this embodiment of the invention still presents alignment difficulty both for the fit of bolts 34 in bosses 30 and for the fit of threaded bolts 42 in bar 36. Also, when damage occurs to modular armor system 28, such damage is likely to collapse rail 32 about bolts 34 mounted therein making the removal of bolts 34 difficult or impossible with limited tools and equipment found in operational units. Repair of damaged units without withdrawal from service is therefore hindered.

Figure 3:
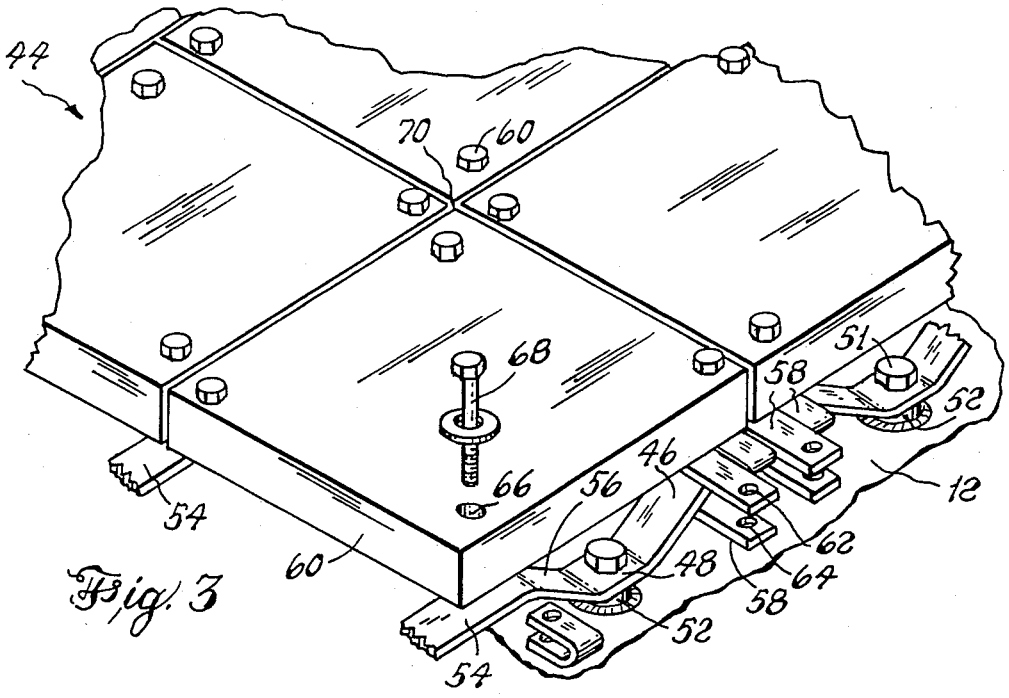
FIG. 3 is a perspective view of a modular armor system according to a further embodiment of the invention.
Figure 4:
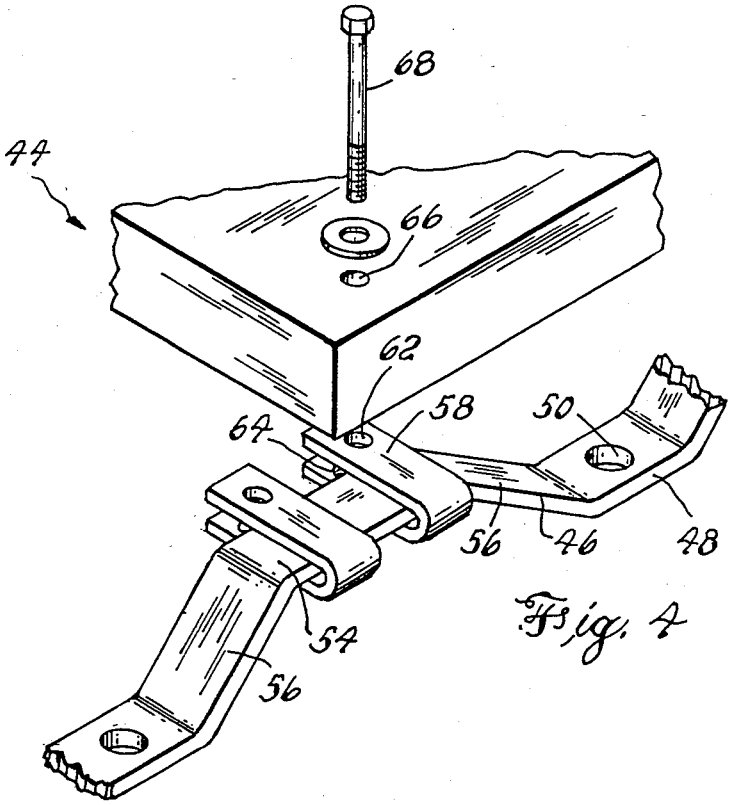
FIG. 4 is a close-up perspective view of a portion of the modular armor system of FIG. 3 with portions omitted for clarity of description.

Referring now to FIGS. 3 and 4, a further embodiment of a modular armor system is shown, generally at 44, which retains the benefits of the foregoing embodiment while also resolving the problems of alignment and simplifies the replacement of damaged portions. A plurality of parallel corrugated straps 46 each include a plurality of lower portions 48, each lower portion 48 having a bolt hole 50 (FIG. 4) therein for receiving a bolt 51 which engages a threaded stud 52 affixed to substrate 12. A flat upper portion 54 is disposed between each adjacent pair of lower portions 48 and joined thereto by an angled portion 56. A U-shaped saddle clip 58 is provided for each corner of an armor module 60 to be affixed. Each U-shaped saddle clip 58 includes a guide hole 62 in an arm thereof positioned adjacent armor module 60 and a threaded hole 64 in the other arm thereof. A mounting hole 66 at each corner of armor module 60 permits the passage therethrough of a mounting bolt 68 which thence passes through guide hole 62 to engage threaded hole 64.

Before tightening mounting bolt 68 in threaded hole 64, each U-shaped saddle clip 58 fits loosely upon its flat upper portion 54 of corrugated straps 46 and thus can be positioned over an extremely wide range for engagement with mounting bolt 68. After engagement between mounting bolt 68 and threaded hole 64 is attained, mounting bolt 68 is tightened, thereby clamping U-shaped saddle clip 58 tightly about flat upper portion 54 and thus to secure one corner of armor module 60 in position.

Corrugated strap 46 is preferably dimensioned to permit disposing up to four U-shaped saddle clips 58 side by side. This is well shown in FIG. 3 wherein four U-shaped saddle clips 58 are included on one flat upper portion 54, with two facing in one direction to secure corners of adjacent illustrated armor modules 60 and two facing in the other direction to secure corners of two armor modules 60 which have been omitted from FIG. 3 for illustrative purposes.

Figure 5:
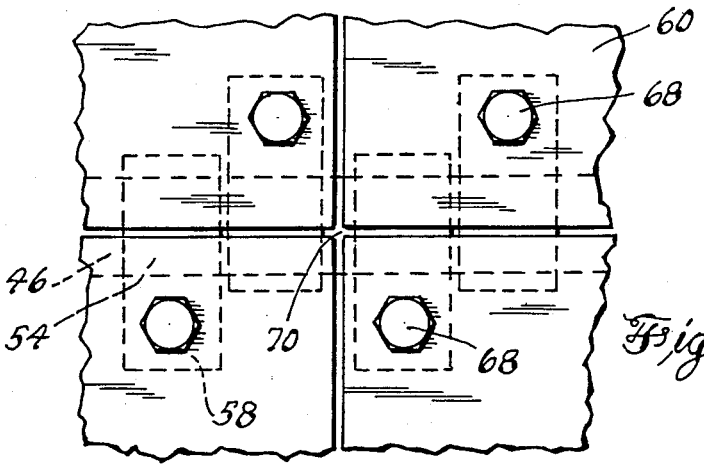
FIG. 5 is a top view of a four-plate intersection of the embodiment of the invention in FIGS. 3 and 4 showing the placement of saddle clips and attachment bolts in dashed line.

It will be noted mounting bolts 68 are not symmetrically located with respect to a four-plate intersection 70. This is even better illustrated in FIG. 5, in which four U-shaped saddle clips 58 are shown disposed on flat upper portion 54 at four-plate intersection 70. This vast improvement in flexible installation virtually eliminates problems of alignment with closely abutting armor modules 60.

One skilled in the art would recognize that other types of clips other than the specific embodiment of U-shaped saddle clip 58 shown, may be used without departing from the spirit and scope of the invention. For example, two U-shaped saddle clips 58 may be replaced by a single bar having two threaded holes therein for engagement by mounting bolts 68 passing through each of two adjacent armor modules 60.

If modular armor system 44 is damaged in a manner which deforms corrugated strap 46 toward substrate 12, as is generally the case, mounting bolts 68 remain accessible for removal of a damaged section and replacement with new corrugated strap 46 and armor modules 60 as necessary to repair the damage. Also, due to the corrugated shape and relatively thin cross section of corrugated strap 46, it can be distorted as necessary for alignment with threaded studs 52 while the wide tolerances offered by U-shaped saddle clips 58 remain capable of attachment of armor modules 60. In this manner, modular armor system 44 permits replacement of damaged portions in the field using simple hand tools without requiring withdrawal of the equipment from the field to a higher-level repair facility.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention.

What is claimed is:

1. An armor support system for supporting armor panels on a substrate comprising:

at least first and second generally parallel bars;

means for affixing said at least first and second generally parallel bars spaced apart on said substrate;

at least one armor panel;

means for affixing said at least one armor panel on said at least first and second generally parallel bars; and said first and second generally parallel bars including means for spacing said at least one armor panel a predetermined distance from said substrate.

2. An armor support system according to claim 1 wherein:

each of said at least first and second generally parallel bars includes a generally rectangular cross section;

said means for affixing said at least first and second generally parallel bars to said substrate includes threaded means affixed to said substrate and bolts passing through holes in said first and second generally parallel bars to engage said threaded means;

said means for affixing said at least one armor panel includes at least one bar extending between said at least first and second generally parallel bars; and at least one bolt affixing said at least one armor panel to said at least one bar, whereby said at least one armor panel is urged into contact with outer surfaces of said at least first and second generally parallel bars.

3. An armor support system according to claim 1 wherein said at least first and second generally parallel bars include:

a corrugated strap; and said corrugated strap having a plurality of flat lower portions and a plurality of flat upper portions, said flat upper portions each being connected to an adjacent flat lower portion by an angled portion.

4. An armor support system according to claim 3 wherein said means for affixing said at least first and second generally parallel bars to said substrate includes a plurality of threaded means affixed to said substrate and at least one hole in each of said flat lower portions alignable with said threaded means and engageable by a bolt passing therethrough into said threaded means for affixing its corrugated strap to said substrate.

5. An armor support system according to claim 3 wherein said means for affixing said at least one armor panel includes:

at least one U-shaped saddle clip having first and second arms embracing said flat upper portion;

a bolt passing between said at least one armor panel and engaging said at least one U-shaped saddle clip;

said at least one U-shaped saddle clip loosely fitting upon said flat upper portion, whereby it is movable thereon for aiding alignment thereof with said bolt; and tightening means cooperating with said bolt for tightening said at least one U-shaped saddle clip upon said flat upper portion and for securing said at least one armor panel thereupon.

6. An armor support system according to claim 5 wherein:

said at least one armor panel includes at least first, second, third and fourth armor panels meeting at an intersection on one of said flat upper portions;

said means for affixing said at least one armor panel includes first, second, third and fourth U-shaped saddle clips disposed side by side embracing said one of said flat upper portions; and first, second, third and fourth bolts passing respectively through bolt holes in said first, second, third and fourth armor panels and engaging said tightening means in said first, second, third and fourth U-shaped saddle clips.

* * * * *